United States Patent [19]

Skoyles et al.

[11] 3,854,779

[45] Dec. 17, 1974

[54] ANTI-LOCK VEHICLE BRAKE SYSTEMS

[75] Inventors: Derek R. Skoyles; Denis Sharp, both of Salfords, nr. Redhill, England

[73] Assignee: U.S. Philips Corporation, New York, N.Y.

[22] Filed: Apr. 19, 1973

[21] Appl. No.: 352,586

[30] Foreign Application Priority Data

May 1, 1972 Great Britain .................. 20105/72

[52] U.S. Cl. .................................. 303/21 P, 303/20

[51] Int. Cl. ............................................. B60t 8/12

[58] Field of Search ............ 188/181 A; 303/20, 21; 317/5; 324/162; 340/53, 262, 62

[56] References Cited

UNITED STATES PATENTS

| | | | |
|---|---|---|---|
| 3,494,671 | 2/1970 | Slavin et al. | 303/21 P |
| 3,606,490 | 9/1971 | Ando | 303/20 X |
| 3,606,491 | 9/1971 | Walsh | 303/21 AF |
| 3,652,133 | 3/1972 | Yamazaki et al. | 303/21 CG |
| 3,677,609 | 7/1972 | Davis et al. | 303/21 BE |
| 3,736,435 | 5/1973 | Runge et al. | 303/21 CG X |

*Primary Examiner*—George E. A. Halvosa
*Assistant Examiner*—Stephen G. Kunin
*Attorney, Agent, or Firm*—Frank R. Trifari

[57] ABSTRACT

An electronic control circuit for an anti-lock vehicle brake system including apparatus responsive to an input signal which is a function of wheel speed for producing an output signal for energizing a solenoid valve when wheel acceleration has fallen below a first negative reference rate and wheel speed has changed by an amount which is greater by a given percentage than its amount of change would have been had its change continued at the first reference rate; apparatus for establishing the first reference rate; apparatus for replacing the first reference rate by a second lower reference rate following the production of the output signal; apparatus for replacing the second reference rate by a third positive reference rate after the second reference rate has persisted for a predetermined time; and apparatus responsive to the input signal for terminating the output signal to cause solenoid valve de-energization when the wheel acceleration attains either the second reference rate or the third reference rate, whichever prevails at the time, the prevailing reference rate being replaced by the first reference rate when said output is terminated.

17 Claims, 12 Drawing Figures

ANTI-LOCK VEHICLE BRAKE SYSTEMS

This invention relates to anti-lock brake systems for wheeled vehicles, that is, brake systems including means for improving braking performance of a vehicle by causing a decrease of the braking force applied to a road wheel of the vehicle if the wheel tends to lock, in a circumstance likely to produce an incipient skid condition, following brake application, said means then causing the braking force to be increased again without the need for any change in the actual braking action (by a person using the brake) causing the brake application. Such brake systems can be successful in reducing the risk of skidding due to wheel lock and in maintaining directional control during braking, and can also reduce braking distances.

When a braking force is applied to a road wheel to reduce vehicle speed, a certain percentage slip is introduced, that is, the braked wheel tends to rotate more slowly than the free rolling speed that should obtain for the prevailing vehicle speed, due to the adhesion force between type and road. As the braking force is increased, this adhesion force increases, accompanied by an increase in the percentage slip, until this adhesion force reaches a maximum at an optimum percentage slip (which typically is 10 percent to 20 percent), after which the adhesion force decreases with further increase of braking force and the percentage slip increases to 100 percent at which the braked wheel becomes locked.

FIG. 1 of the accompanying drawings illustrates diagrammatically typical force/slip curves for road surfaces affording different coefficients of friction ($\mu$) to a vehicle wheel.

The force/slip curve 1 is for a typical high ($\mu$) surface (e.g., $\mu = 1$), the force/slip curve 2 is for a typical intermediate ($\mu$) surface (e.g., $\mu = 0.5$), and the force/slip curve 3 is for a typical low ($\mu$) surface (e.g., $\mu = 0.1$).

The aim of an anti-lock vehicle brake system in respect of each road wheel controlled by it, is to anticipate wheel locking before it actually occurs and to control the braking force such that the wheel is kept turning in the region of maximum adhesion force between type and road, that is, in the region where the optimum percentage slip occurs.

Many anti-lock vehicle brake systems have been proposed; some simple and others complex. Those operating on rear wheels only of a vehicle are usually simple and this is admissible partly because weight transfer to the front wheels during braking makes rear wheel braking less important, and partly because the extra inertia of the vehicle transmission (in the case of rear wheel drive) can assist the anti-lock braking control action. A simple system is rarely adequate when operating on front wheels of a vehicle because, in this case, the anti-lock braking control action has to be very accurate in order to achieve on a high ($\mu$) surface, vehicle stopping distances that are comparable with locked wheel stopping distances without any anti-lock braking control action. Thus, a complex system is usually necessary in this case and also in the case where the system operates on each road wheel of a vehicle.

Some anti-lock vehicle brake systems which have been proposed are wholly mechanical and use an inertia sensor for detecting when wheel locking is imminent due to an excessive braking force. Upon detecting such a condition the inertia sensor acts to reduce the braking force, for instance by opening a relief valve to reduce fluid pressure which is producing the braking force. Other anti-lock vehicle brake systems use an electronic control circuit for detecting when wheel locking is imminent due to an excessive braking force, together with a solenoid valve which is actuable by the control circuit to reduce fluid pressure at the brake. It is with these latter anti-lock vehicle brake systems that the present invention is particularly concerned.

According to the present invention there is provided for an anti-lock vehicle brake system an electronic control circuit comprising, means responsive to an input signal having a quantity which is a function of wheel speed to produce an output for causing energization of a solenoid (valve) when said quantity has changed at a rate in excess of a first reference rate and by an amount which is greater by a given percentage than its amount of change would have been had its change continued at that first reference rate, the latter corresponding to a first value of wheel deceleration, means for establishing said first reference rate within said control circuit, means for replacing said first reference rate by a second reference rate following the production of said output, said second reference rate corresponding to a second value of wheel deceleration that is more negative than said first value, means or replacing said second reference rate by a third reference rate after said second reference rate has persisted for a predetermined period of time, said third reference rate corresponding to a first value of wheel acceleration, and means responsive to said input signal for terminating said output to cause solenoid de-energization) when the rate of change of said quantity attains either said second reference rate or said third reference rate, whichever prevails at the time, the prevailing reference rate being replaced by said first reference rate when said output is terminated.

With such a control circuit, it is expected that for a high ($\mu$) road surface the termination of said output will occur during the period that said second reference rate persists, because a wheel at which the braking force has been reduced will recover quickly (from its tendency to decelerate to a locked condition) on such a road surface. Thus, in this instance, the solenoid valve will be held energised for a duration which at the most can extend only up to the end of said predetermined period. For a low ($\mu$) road surface, the wheel can take so long to recover that said third reference rate will prevail so that the solenoid valve will not be energised until the wheel is accelerating at said first value of wheel acceleration. For an appreciation of the foregoing it is to be understood that when the wheel speed initially changes by said given percentage at a rate in excess of the first reference rate, the wheel continues to decelerate to a much higher deceleration value than that to which said first reference rate corresponds, before its starts to recover, this being due to the solenoid energisation time and the inherent inertial delay in an anti-lock vehicle brake system before the braking force is actually reduced.

The response by the control circuit to said input signal quantity can provide in effect, a means of wheel slip detection. Thus, if said first reference rate is chosen in relation to an estimated maximum safe value of vehicle deceleration that a vehicle, for which an anti-lock vehicle brake system embodying the control circuit is intended, can achieve on braking without wheel locking, and said given percentage change of said input signal quantity is chosen in relation to the optimum percentage slip range, then the control circuit response will occur when the wheel is rotating more slowly (by the given percentage change) than the free rolling speed that should obtain for the prevailing vehicle speed with the vehicle decelerating at the estimated maximum safe value. For example, if the estimated maximum safe value of vehicle deceleration is 1g, then said first reference rate may be 1.5g, allowing for a safety factor. Because of this safety factor, said given percentage change may be smaller than the optimum percentage slip range, since a measure of slip is already introduced by the safety factor. Thus, said given percentage change may be within the range 7 percent to 10 percent.

The change from said first reference rate to said second reference rate and/or the change from said second reference rate to said third reference rate may be substantially instantaneous (allowing for circuit performance limitations), or may be at a predetermined rate of change.

With a control circuit according to the present invention as considered so far, it will be apparent that said third reference rate cannot be maintained indefinitely because, if it was, the solenoid valve would not be deenergised if the rate of change of said input signal quantity never attains that third reference rate, as might be the case on a low ($\mu$) surface. The third reference rate can be arranged to last for a preset period of time, following which the solenoid valve is deenergised by the control circuit regardless of what rate of change said input signal quantity has reached, but if this preset period is too short the wheel concerned might only just be starting to recover, as might be the case for a low ($\mu$) surface, in which event the wheel would quickly decelerate to (and possibly reach) the locked condition when the braking force is increased again following solenoid de-energisation. On the other hand, if the preset period is too long, the time taken for the wheel to reach said first value of wheel acceleration (i.e., at which said input signal quantity attains said third reference rate) may be too long to be acceptable. Thus, a compromise would have to be made when selecting this preset period, which may be satisfactory for less sophisticated anti-lock vehicle brake systems.

However it is preferable, according to an important feature of the present invention to include in the control circuit a control means which is responsive to the same or similar input signal conditions that cause the production of said output for solenoid energisation and remains responsive until the input signal quantity has a value corresponding to a certain wheel speed relative to that obtaining when the control means was rendered responsive, the control circuit being so arranged that whilst said control means is responsive, the prevailing reference rate is not replaced by said first reference rate following termination of said output to cause solenoid de-energisation, but instead said second reference rate is allowed to persist for the remainder of said predetermined period of time with said third reference rate replacing it as aforesaid, or said third reference rate is maintained, depending on which reference rate was prevailing at the time said output was terminated, so that if said input signal quantity subsequently assumes either the second or the third (prevailing) reference rate whilst this quantity still has a value less than said value, the solenoid is re-energised by the reproduction of said output. In this way, the duration of said third reference rate will be a function of the time taken for the wheel to recover towards free rolling speed. Said certain wheel speed can be the speed the wheel would have been doing if it had continued to decelerate at a selected deceleration value (which is said first value or a slightly lesser value) from the time when the control means was rendered responsive, that is, what will be termed the "extant speed." Alternatively, said certain wheel speed can be the speed which the wheel had when the control means was rendered responsive. In this latter case, this certain wheel speed (as would be achieved by a zero deceleration reference setting in the control means) is preferably changed to the extent speed after a preset period. Without such a change, there might be unacceptably long durations of solenoid energisation on very low ($\mu$) surfaces.

The control circuit is preferably further arranged such that if the solenoid (valve) is still energised when said control means ceases to be responsive, said third reference rate is maintained, with the control circuit further including means responsive to terminate the output causing solenoid energisation when the rate of change of said input signal quantity no longer exceeds a fourth reference rate of change that corresponds to a second value of wheel acceleration that is lower than said first value.

It has been found that this achieves good anti-lock braking control on low ($\mu$) surfaces.

Since the input signal to the control circuit is likely to include noise which can cause momentary amplitude changes thereof it is desirable to arrange that said second reference rate is preceded by a further reference rate, which corresponds to a value of wheel deceleration much less negative than said first value of wheel deceleration, for a period just longer than the time taken for the solenoid (valve) to pull-in when it is energised. This low deceleration period prevents solenoid "chatter." A similar consideration applies when the solenoid valve is de-energised, at which time resetting to said first reference rate is preferably delayed for a short period to avoid spurious resetting.

Also, when an anti-lock braking control action on a wheel ceases it sometimes happens that the vehicle suspension can be excited into a resonance. As a result, the wheel appears to overshoot the vehicle speed and then decelerate rapidly back to its current speed as the oscillation is damped out. This apparent rapid deceleration can cause a new anti-lock braking control action to be started at a time when it is not required. To prevent this happening an electronic control circuit according to the invention is preferably further arranged such that when set to said first reference rate it assumes for a short period yet a further reference rate corresponding to a much higher value of wheel deceleration than said first deceleration value, before assuming said first rate. This short period is so chosen to allow the aforementioned oscillations to decay to a negligible value before resetting to said first reference rate.

If an anti-lock control action is not terminated by the control circuit because conditions are such that the rate of change of wheel speed cannot attain any of the reference rate of change values, then it would continue indefinitely. To prevent this possibility, the control circuit can further include a timer which automatically de-energises the solenoid (valve) and resets the control circuit to said first reference rate after a preset time.

Suitably, the input signal to an electronic control circuit according to the invention is derived from a train of pulses produced by a transducer which is so arranged that the frequency of the pulse train is a function of (e.g., proportional to) the speed of rotation of a wheel to be controlled by an anti-lock brake system embodying the circuit. However, the input signal may be derived directly from an accelerometer associated with a wheel to be controlled. Alternatively, the derived input signal can be a d.c. signal the amplitude of which varies with increase in wheel speed as a natural log. function.

In order that the invention may be more fully understood reference will now be made by way of example to the accompanying drawings of which:

Figure 1:
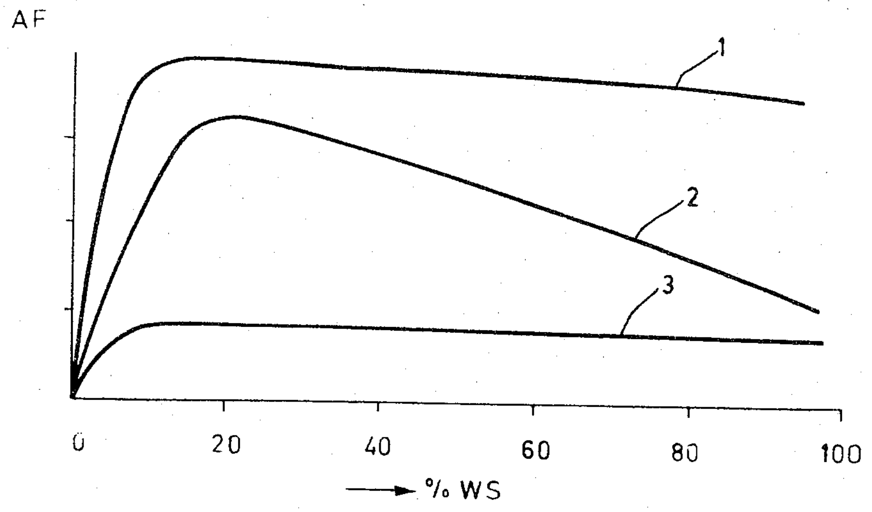
FIG. 1 shows, as aforesaid, typical force/slip curves.
Figure 2:
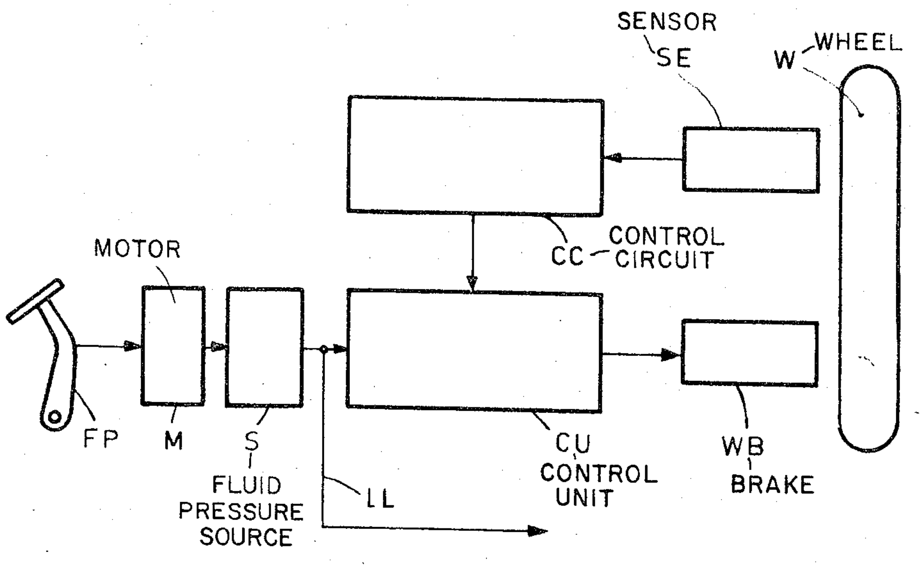
FIG. 2 is a diagrammatic general layout for an anti-lock vehicle brake system.

FIGS. 8 to 12 together show a circuit diagram of a control circuit according to the invention: and Referring to the drawings, the general layout for an anti-lock vehicle brake system shown in FIG. 2 shows a brake pedal FP for actuating a braking pressure modulator M which controls the application of fluid pressure from a fluid pressure source S of the system to a wheel brake WB. An anti-lock control unit CU is provided between the fluid pressure source S and the brake WB. A wheel movement sensor SE supplies an electrical signal related to rotational movement of a wheel W, for which the brake WB is provided, to an electronic control circuit CC. This electrical signal can be so derived directly by the sensor SE as to vary as a function of rate of change of wheel speed, or the electrical signal can be so derived (e.g., as a train of pulses) as to be proportional to wheel speed and converted by an input stage of the electronic control circuit to an effective input signal which varies in proportion to or as another function of rate of change of wheel speed. The anti-lock control unit CU would include a solenoid valve which is energised by an electrical output from the electronic circuit CC to cause braking force applied to the wheel brake WB to be reduced. In the present instance, the control circuit CC is assumed to be in accordance with the invention, and its further operation to terminate the anti-lock braking control action will be dealt with presently.

As indicated by the lead LL, separate systems as shown in FIG. 2 (with a common fluid pressure source) can be provided in respect of each road wheel of a vehicle, but it would also be possible to provide a single system for two (rear) wheels driven by a vehicle transmission shaft with a sensor associated with the shaft for producing the electrical signal related to wheel rotational movement. As another alternative, a single anti-lock control unit with its solenoid valve may be provided in common for all the road wheels of a vehicle. In this case, each road wheel would have its own wheel movement sensor and associated electronic control circuit, and any of the latter would provide an electrical output to energise the solenoid valve when the appertaining wheel tends towards a locked condition.

Figure 3:
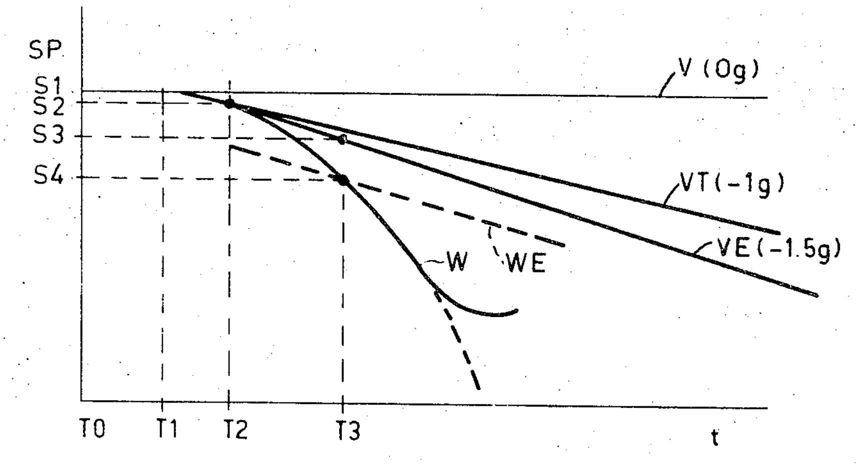
FIG. 3 shows diagrammatically "wheel-slip" detection for the first cycle of an anti-lock control action.

Turning now to FIG. 3, this figure shows on a graph of speed against time a straight line curve V which represents a constant vehicle speed S1 (i.e., 0g), a straight line curve VT the slope of which represents a theoretical maximum vehicle deceleration (e.g., −1g) that a vehicle for which an anti-lock vehicle brake system is intended can achieve on braking without wheel locking, a straight line curve VE which represents an estimated vehicle speed at a deceleration of (e.g., −1.5g), which is greater than the theoretical maximum vehicle deceleration by a safety factor, a broken line straight line curve WE which represents an estimated wheel speed for optimum percentage slip relative to the estimated vehicle speed VE, and a curve W which represents actual wheel speed.

Before a braking force is applied to the wheel the actual vehicle speed S1 equals the wheel speed over the period T0 to T1. Assuming that a braking force is applied at time T1, the wheel will decelerate until at time T2 and at a speed S2 it will have exceeded the estimated vehicle deceleration VE. At time T3 the wheel will have fallen to a speed S4 which is below the estimated vehicle speed VE at time T3 by a percentage slip which may be of the order of 7 percent to 10 percent. As will be described, the control circuit produces its output for solenoid energisation at time T3. After solenoid energisation wheel speed continues to fall for a time until the braking force is reduced sufficiently for the wheel to start to recover. The period T1 to T3 represents a time delay to which the difference between the actual vehicle speed and the estimated vehicle speed is proportional at time T3.

Figure 4:
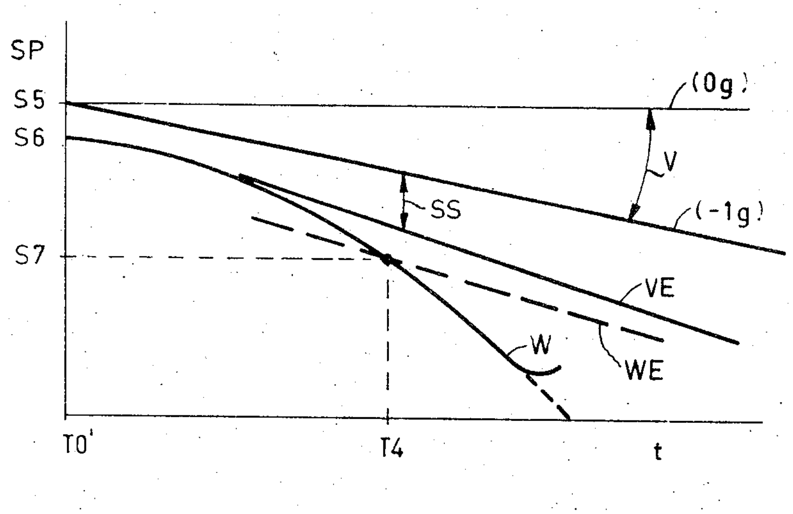
FIG. 4 shows diagrammatically "wheel-slip" detection for subsequent cycles of an anti-lock control action.

Once the wheel has recovered sufficiently, as will be described, the braking force is re-applied to the wheel. Turning now to FIG. 4, after the recovery of the wheel, the vehicle at time T0' may have a speed S5 and any deceleration V between (0g) and (−1g). However, the wheel has only a speed S6 at time T0' because it is not allowed to recover to vehicle speed. Therefore, for subsequent anti-lock control cycles, estimated speeds start from an initial percentage slip rather than zero slip. SS represents this initial percentage slip at any speed. Thus, when the output for solenoid energisation is next produced at time T4, the wheel has a speed S7 and thus a percentage slip greater than 7 percent to 10 percent by the percentage slip SS. It is estimated that the total slip will be in the 10 percent to 20 percent optimum percentage slip range.

Figure 5:
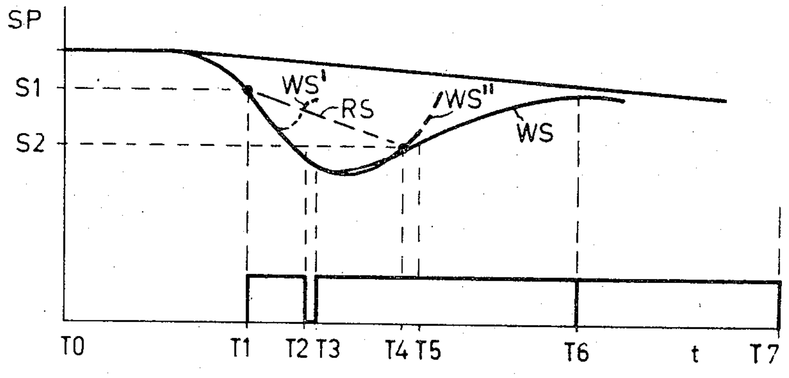
FIG. 5 shows diagrammatically periods of solenoid energisation as determined by a control circuit according to the invention.
Figure 6:
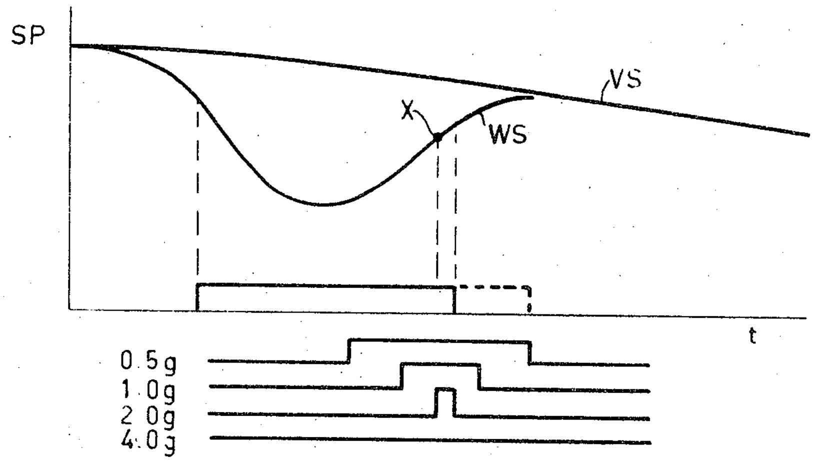
FIG. 6 shows a modified control function of the control circuit.
Figure 7:
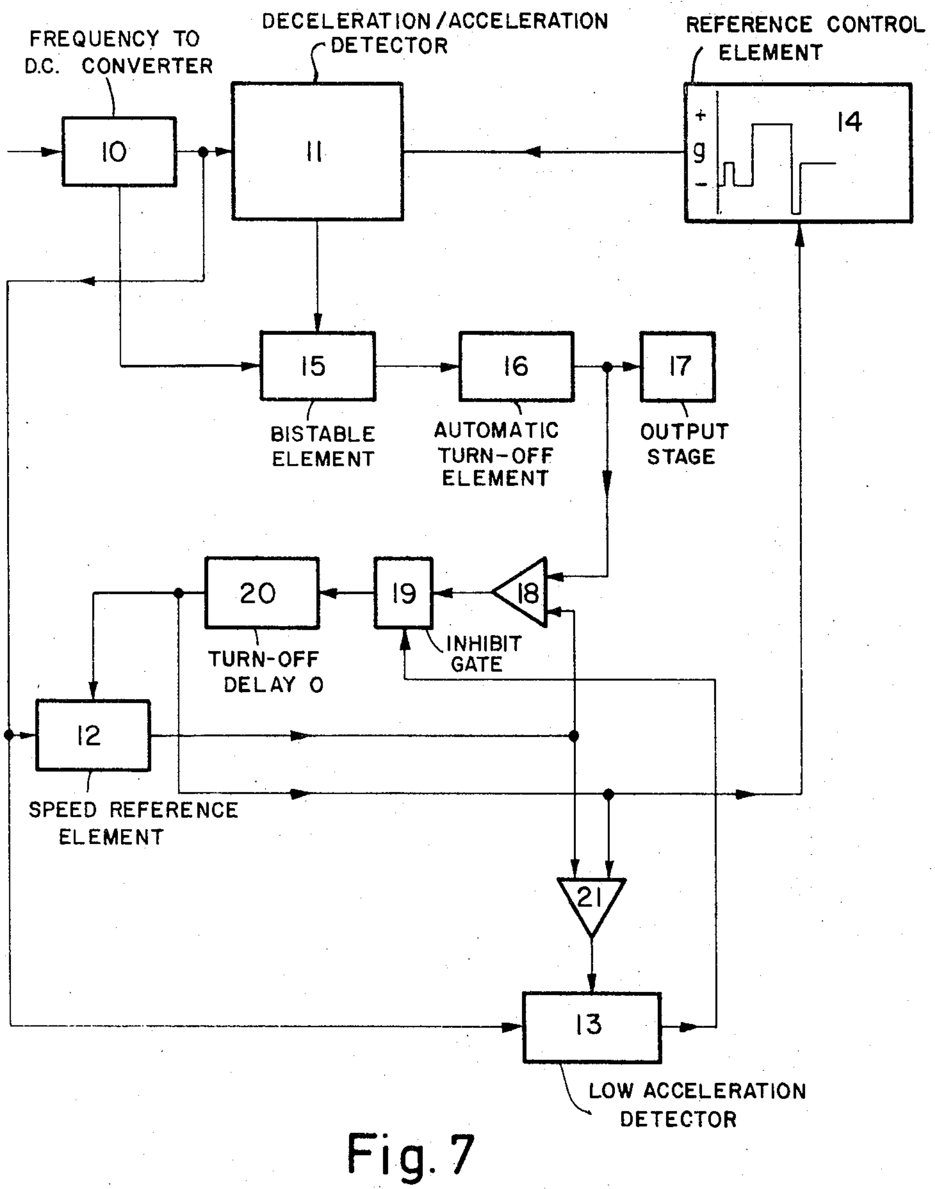
FIG. 7 shows a block diagram of a control circuit according to the invention.

Referring now to FIGS. 5, 6 and 7, the block diagram of a control circuit according to the invention shown in FIG. 7 comprises a frequency-to-d.c. converter 10 for receiving pulses of frequency proportional to speed of rotation of a wheel. The output from the convertor 10 is a d.c. signal having a magnitude which is a function of the input pulse frequency. This d.c. signal is applied to a deceleration/acceleration detector 11 and also to a speed reference element 12 and a low acceleration detector 13. A reference control element 14 feeds reference control signals to the detector 11. Initially, the detector 11 receives from the element 14 a reference control signal corresponding to a first value of wheel deceleration. When the rate of change of the magnitude of the d.c. signal from the convertor 11 exceeds this first value of wheel deceleration and also undergoes a change in magnitude such as to signify a given percentage wheel slip, as aforesaid, the element 11 triggers a bistable element 15 which produces via an automatic turn-off element 16 an output which energises an output stage 17. The input pulses from the wheel movement sensor are applied to reset the bistable element 15, which latter is held triggered to maintain the output stage energised until the trigger output from the element 11 is terminated. The output from the element 15 is also fed (via 16) through an OR gate 18, an inhibit gate 19, and a turn-off delay element 20 to the speed reference element 12 to synchronise the operation of the latter with the output for solenoid energisation. The trigger output from element 15 is also fed via an OR gate 21 to inhibit the detector 13 at this time.

The element 12 is responsive to the same or similar initial d.c. input signal conditions as the detector 11 and provides another input to both the OR gates 18 and 21. The reference control element 14 is responsive to the output from element 15 to commence a reference cycle in which it changes the reference control signal to the element 11 to a signal corresponding to a second, less negative value (e.g., 0.1g) of wheel deceleration for, say, 10 ms, then to a signal corresponding to a third, more negative value (e.g., –3g) of wheel deceleration for, say, 40 ms, and then to a signal corresponding to a first value (e.g., +6g) of wheel deceleration. If during this reference cycle the detector 11 detects the relevant wheel condition from the d.c. input signal, it terminates its output so that the bistable element 15 is reset and the solenoid de-energised. However, the element 12 is arranged to maintain its output the whole time the wheel speed is less than it would have been had the wheel continued to decelerate at said first deceleration value from the time the element 12 was rendered responsive. Consequently, if the wheel speed is less than such a speed, the output from the element 12 maintains the reference control element 14 responsive. As a result, if the wheel rate of change subsequently assumes that of a reference control signal, the detector 11 re-triggers the bistable element 15 so that the solenoid valve is reenergised. If the solenoid is still energised when the element 12 is no longer responsive, this element is, in effect, inhibited so that it apparently remains on and the element 14 is not reset.

There are now three ways in which the element 14 can be reset; the first is if the element 11 detects the first value of wheel acceleration; the second is if the element 13 detects the end of a second, low, value of acceleration (e.g., <1g); the third is by means of the element 16, which becomes responsive after, say, 0.5 secs. The element 13 is normally held inhibited while the solenoid energisation output and the output from the element 12 are present but in the absence of the output from element 12 it can respond to the end of said second acceleration condition to produce a pulse that inhibits gate 19 and thereby allows the element 14 to be reset.

FIG. 5 shows diagrammatically the circuit response. The curve WS represents the wheel speed signal which at speed S1 has caused solenoid energisation at time T1. Assuming that at time T2 the first reference value of wheel deceleration prevails, then since the wheel speed signal WS no longer exceeds this reference value, the solenoid valve is de-energised. However, the wheel speed is below the speed reference curve RS, as determined by element 12, so that the element 14 is not reset. Therefore, if at time T3 the first reference value of wheel acceleration prevails, the solenoid valve will be re-energised because the wheel speed signal WS has not reached this first acceleration value at time T3. On the other hand, if the wheel has recovered sufficiently (as may be the case on a high ($\mu$) surface) for its speed to be above the reference curve RS', as indicated by the curve WS', then the solenoid valve would not be re-energised.

After time T4 when the reference curve RS has reached the speed value S2, de-energisation of the solenoid can be at time T5 when the wheel, as signified by the curve WS'' has exceeded said first reference value of wheel acceleration, or at time T6 when the wheel no longer exceeds the second, low, value of wheel acceleration, or at time T7 by the element 16.

The circuit logic so far considered can be modified in two important respects. Firstly, the bistable element 15 can be replaced by a turn-off delay circuit which is triggered on by the output from element 11 to produce a solenoid energisation output for a short period, say, 10 ms. This allows the trigger-off signal from the input speed signal to be dispensed with and permits simplification of the circuit. It also allows the use of more than one frequency-to-d.c. converter (10) to be provided for respective wheels to combine the respective input signals from their wheel movement sensors to effect solenoid energisation. Thus, it can be arranged that the lowest speed signal, or the highest speed signal, or the average of the several speed signals, causes solenoid energisation. Secondly, the low acceleration detector 13 has only a single sensing level of the order of 0.5g and is used mainly on very low ($\mu$) surfaces (e.g., 0.1$\mu$). In order to cater for intermediate surfaces (e.g., 0.2$\mu$ to 0.5$\mu$), additional low acceleration detectors can be provided in parallel with the existing one. These additional acceleration detectors would have higher acceleration responses. The effect of this modification is illustrated in FIG. 6 which shows a curve VS representing vehicle speed and a curve WS representing wheel speed in a graph of speed against time. Assuming four acceleration detectors having sensing levels of 0.5g, 1.0g, 2.0g and 4.0g, respectively, then as the acceleration of the wheel increases the detectors sense in sequence. In the diagram the wheel did not exceed 4.0g so that the 4g detector did not sense. As the wheel passes through its peak acceleration (i.e., point X), the detectors turn-off in the same order that they turned-on. Since the solenoid would have been energised for a long time, (i.e., until the end of the sensing by the 2g detector), the braking force would be practically zero so that the acceleration of the wheel is mainly a function of the road surface. The peak acceleration would therefore occur as the wheel passes through the peak of the force/slip characteristic.

The circuit response can be modified by making the reference curve RS slightly less than the first value of wheel deceleration, or by making the reference curve RS horizontal (i.e., a zero deceleration value), or by making the reference curve RS horizontal for a period following which it assumes said first value or said slightly less value, for instance when the wheel reaches a certain minimum acceleration. This latter modification will be considered presently with reference to FIGS. 14 and 15. Another modification, which will be considered with reference to FIGS. 16 and 17, is to alter the reference curve (as depicted in the reference control element 14 of FIG. 7, so that the change from the first to the second deceleration value, and the change from the second deceleration value to the first acceleration value are at a given rate.

Figure 8:
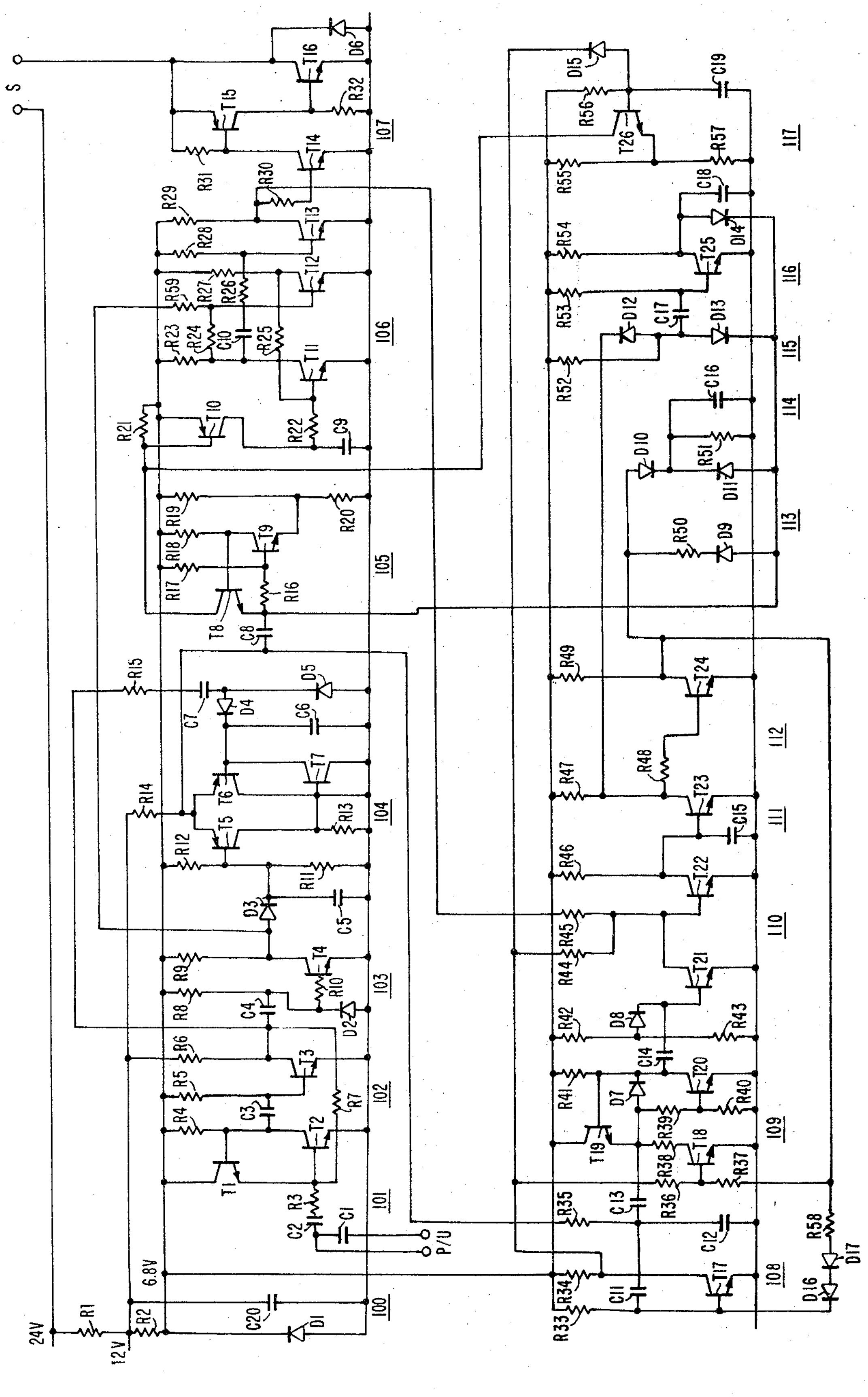
Figure 9:
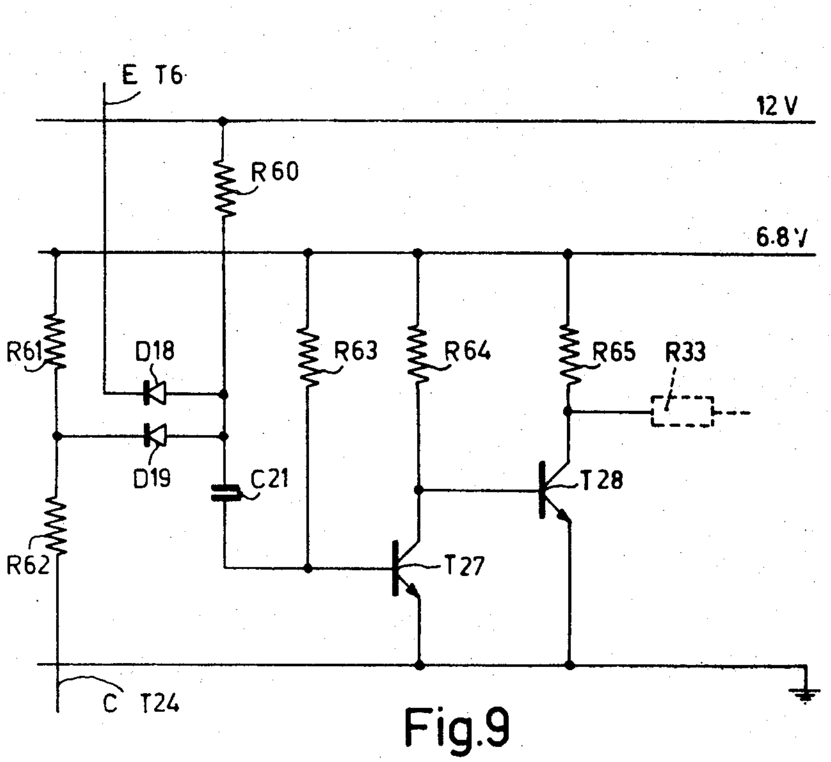
Figure 10:
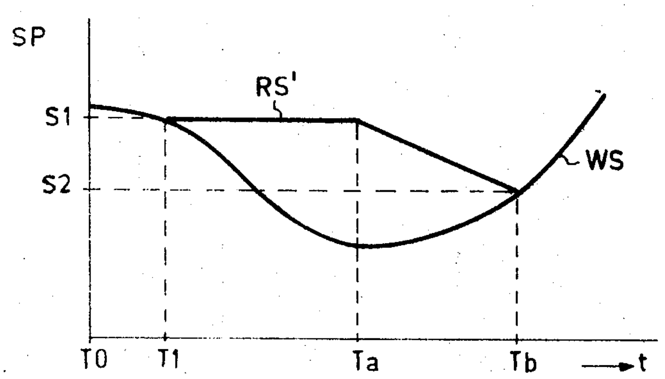
Figure 11:
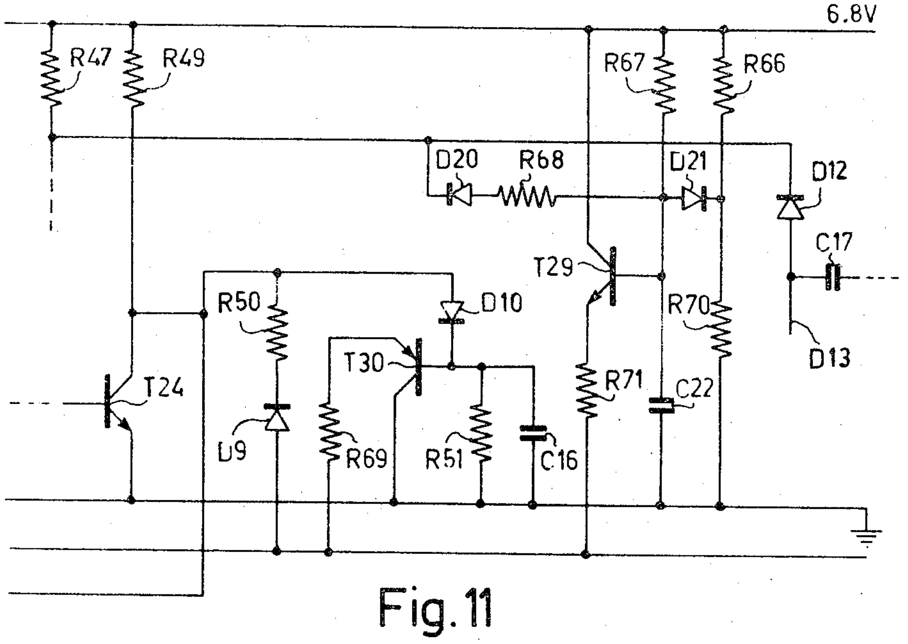
Figure 12:
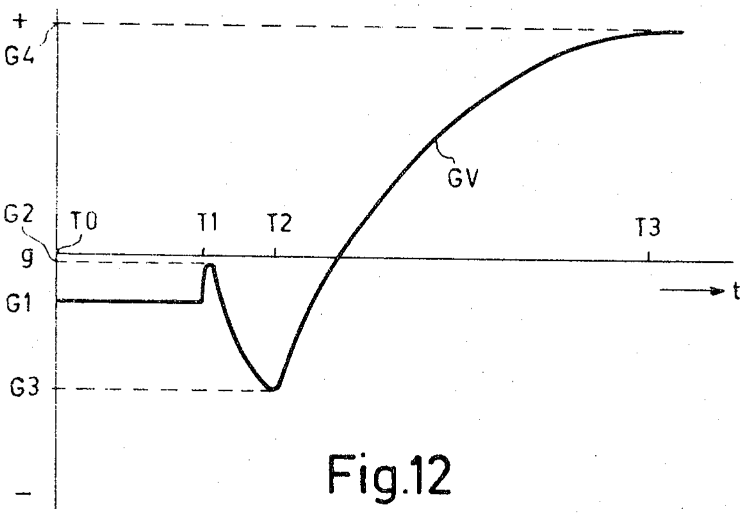

A complete circuit diagram for the block diagram of FIG. 7 is shown in FIGS. 8 to 13 when placed side-by-side in numeral order with FIG. 8 on the left. The circuit element 100 is a supply filter and voltage stabiliser for the rest of the circuit and provides a 6.8V stabilised voltage line from a 12V nominal supply voltage. The circuit element 101 is an input limiter/amplifier which amplifies and limits the signal from a wheel pick-up P/U which produces a train of pulses whose frequency is proportional to the speed of rotation of a vehicle wheel controlled by the system. This pick-up P/U can comprise a toothed steel ring mounted for rotation with the wheel adjacent a magnetic transducer. A voltage is generated in the transducer whose frequency is proportional to the speed of rotation of the wheel. The output from the element 101 is applied to the circuit element 102 which is a pulse generator for producing a 200 $\mu$S pulse whenever the input voltage from the pick-up P/U exceeds a pre-set positive value. The output pulse from the element 102 is fed to the circuit elements 103 and 104. The circuit element 103 is a pulse generator for producing a 500 $\mu$S pulse at the termination of each pulse applied to it from the element 102. The circuit element 104 is a frequency-to-d.c. convertor which samples the pulses from the element 103 to produce a (speed signal) voltage whose value is a function of the input pulse frequency. This is achieved as follows: in the element 104, capacitor C6 stores the speed signal voltage. This voltage, plus the $V_{be}$ of transistor T6, is also present at the emitter of this transistor T6 which is connected as an emitter follower, and also at the emitter of transistor T5. The base of transistor T5 is connected to receive the output from the element 103 and if this output takes the base of transistor T5 more negative than its emitter than this transistor will start to conduct. This will cause a further transistor T7 to conduct to discharge capacitor C6 until the voltage on this capacitor, and thus the voltage at the emitter of transistor T6, is reduced sufficiently to render transistor T6 non-conductive. In this way the stored speed signal voltage varies with change in the input voltage applied to the base of transistor T5. Since this input voltage is reset to a maximum at the beginning of each pulse from the element 103 and decays to a minimum value just before the next pulse, it has an average value which is a function of the time between successive pulses. By appropriately selecting the values of components C5, R12 and R11, to control the rate of decay of the input voltage, the resulting output voltage at the emitter of transistor T6 can be given an amplitude which varies with increase in wheel speed as a natural log. function. This is important for slip detection, as will be described. The elements 101–104 comprise the unit 10 in FIG. 7.

The circuit element 105 is a deceleration (slip) detector in which transistor T9 is turned hard on by a current fed into its base from a resistor R17. The current needed by transistor T9 in order to bottom it is only a small part of that supplied so that the performance of the circuit is relatively independent of the gain of the transistor. With transistor T9 bottomed, transistor T8 is cut off. Normally the voltage at the emitter of transistor T8 is the same as that at the base of transistor T9 because there is no current flowing in resistor R16. In order for transistor T9 to be turned off, and hence transistor T8 turned on, sufficient reverse current must flow in resistor R16 which is so poled as to cause the base current of transistor T9 to be reduced almost to zero. The speed signal voltage from element 104 is differentiated by capacitor C8 and resistor R17 which produce such reverse current when the rate of change of the speed signal voltage is sufficiently high. In other words, the values of these components C8 and R17 determine the aforementioned first value of wheel deceleration. The value of resistor R16 determines an amount of voltage change due to this current which has to occur before transistor T9 is cut off. By this means, slip detection as described previously with reference to FIGS. 3 and 4 is achieved. It will be appreciated that because resistor R16 is of fixed value, the speed signal voltage has to be logarithmic, as aforesaid, in order that the required percentage slip is obtained over a range of wheel speeds. Alternatively, if a speed signal voltage which is directly proportional to wheel speed were employed, the same effect could be achieved by using a circuit capable of producing a variable (slip) resistance effect.

When transistor T9 is turned off, its collector voltage will rise and cause transistor T8 to turn on. The current that flows in transistor T8 at this time causes transistor T10 to turn on. Since the element 104 is responsive to pulses, its output comprises a series of steps rather than a "smooth" varying d.c. As a consequence, the differentiation at components C8 and R17 is in respect of each voltage step of the speed signal voltage, so that transistor T8 is pulsed to produce a pulse output at its collector. The element 105 corresponds to the unit 11 in FIG. 7.

The pulses from the element 105 are applied to the base of transistor T10 in the circuit element 106 which is a bistable and an automatic turn-off circuit. The transistor T10 produces at its collector, pulses which are lengthened by means of a capacitor C9. These lengthened pulses must overlap the leading edge of the pulses from the circuit element 103 which are also applied to the circuit element 106. Transistors T11 and T12 form a trigger circuit arranged to be triggered into one state by the lengthened pulses from transistor T10, and into the other state by the leading edge of the pulses from the circuit element 103. Normally, transistor T12 is triggered on by the pulses from the element 103 to hold off transistor T11 until the output pulses from the element 105 are produced. These latter output pulses cause the state of the trigger circuit to be reversed, that is, transistor T11 turns on and transistor T12 turns off. The trigger circuit is arranged so that the transistor T11 will turn off again only when the output pulses from the element 105 cease. When transistor T11 turns on it produces an output which turns off a transistor T13 which comprises the automatic turn-off part of the element 106. This transistor T13 remains cut off for a maximum time determined by capacitor C10 and resistors R26 and R28, during which time its collector goes positive to turn on transistors T14, T15 and T16 of circuit element 107 which is a power output stage. An output is taken from the collector of transistor T16 to effect solenoid energisation. Normally, transistor T13 will be turned on again before the end of the maximum time mentioned above as a result of normal anti-lock operation. The circuit element 106 comprises the units 15 and 16 and the circuit element 107 comprises the unit 17 in FIG. 7.

In order to provide the deceleration/acceleration reference control, the output at the collector of transistor T13 in element 106 is also applied to circuit element 110, which is an OR-gate and inhibit circuit, to turn on transistor T22 therein. As a result, transistor T23 in circuit element 111, which is a turn-off delay circuit, is turned off to turn on transistor T24 in circuit element 112, which is an inverter circuit. When transistor T24 is turned on, resistor R50 and diode D9 in circuit element 113 provide a path to apply a reference current to the junction of capacitor C8 and resistor R16 in circuit element 105 to change the current required from the speed signal voltage to maintain transistor T9 cut off to a value corresponding to a small –G (say 0.1 g). The reason for this is to prevent spurious turn on of transistor T9 due to noise in the speed signal voltage which might cause a momentary change of rate of the latter less than the first reference rate during the time taken for the solenoid valve to pull-in. As aforesaid, this low deceleration prevents solenoid "chatter."

When transistor T23 is turned off it also initiates a circuit action in circuit element 116. With transistor T23 turned on diode D12 is forward biased and diode D13 is reverse biased in the circuit element 116. With transistor T23 turned off diode D12 becomes reverse biased and capacitor C17 charges up through resistor R52 until after a pre-set period, say 10 ms., diode D13 becomes forward biased to apply a reference current to the junction of capacitor C8 and resistor R16 in circuit element 105 to change the current required from the speed signal voltage to maintain transistor T9 cut off to a value corresponding to a large –G (say –3g). This second reference current persists for a period of, say, 40 ms., when it is replaced by a third reference current that changes the current required from the speed signal voltage to maintain transistor T9 cut off to a value corresponding to a large +G (say + 6g). The circuit element 114 produces this third reference current following turn on of transistor T24, when the collector of this transistor goes low to reverse bias diode 10 so that capacitor C16 discharges through resistor 51 until diode D11 becomes forward biased to provide this third reference current.

With the circuit arrangement as so far described, if the speed signal voltage attains either the second deceleration value (–3g) or the first acceleration value (+ 6g) during the persistance of the appropriate reference rate, then transistor T9 will turn on again to turn on transistor T13 and thus turn off transistors T14, T15 and T16 to cause de-energisation of the solenoid to terminate the anti-lock operation. When transistor T13 turns on, so that transistor T22 is turned off, transistor T23 is not turned on again until after a 5–10 ms. delay, which is determined by capacitor C15 charging up through resistor R46, so that the subsisting reference current is maintained for this "turn-off" delay period. This serves to prevent spurious re-setting due to noise in the speed signal voltage. After this delay period, turn on of transistor T23 produces a voltage pulse across capacitor C17 (element 116) which turns off a transistor T25 for a short period, say 10 ms., during which a reference current flows through diode D14 to the junction of capacitor C8 and resistor R16. This latter reference current is such as to change the current required from the speed signal voltage to maintain transistor T9 cut off to a value corresponding to a large –G (say –10 g). This prevents spurious operation due to wheel speed overshoot as mentioned earlier in this specification. The circuit element 110 comprises the units 18 and 19, the circuit element 111 comprises the unit 20, and the circuit elements 113, 114, 115 and 116 comprise the unit 14, in FIG. 7.

With the circuit arrangement as so far described, no account is taken of the wheel speed that has been attained when the rate of change of wheel speed attains the reference deceleration determined by circuit element 115 or the reference acceleration determined by circuit element 114, as the case may be, to cause solenoid de-energisation. A wheel speed reference is provided by the circuit element 108. In this circuit element a transistor T17 has its base connected to receive the speed signal voltage from the emitter of transistor T6 via a resistor R35 and a capacitor C11. This capacitor C11 and a resistor R33 determine a rate of change of speed signal voltage which is necessary to turn off transistor T17, this rate of change being chosen to be the same or slightly less than the rate of change required to turn off transistor T9. For instance, transistor T9 may be set to turn off to a 1.5 g deceleration value, and transistor T17 to a 1.0 g deceleration value. Resistor R35 determines a set amount of change in wheel speed at the chosen rate of change, in the same manner as resistor R16, before transistor T17 can turn off. The output from the circuit element 108, which is taken from the collector of transistor T17, is applied to the base of transistor T22 via resistor R44 to maintain this transistor on independently of the output from the collector of transistor T13 in the circuit element 106. Therefore, since the turn on of transistor T22 controls the production of the reference rates from the circuit elements 113 – 116, transistor T17 is not turned off to effect this independent control until after the reference rate sequence has been initiated from transistor T13. More specifically, the base of transistor T17 receives an inhibiting current corresponding to a high acceleration value via diodes D16 and D17 and a resistor R58 from the collector of transistor T24, until this transistor is turned on by transistor T23 when transistor T22 is turned on. Once transistor T24 has turned on the inhibiting current ceases and transistor T17 can turn off. When the voltage at the base of transistor T17 rises at a rate determined by resistor R33 and capacitor C11, as modified by the speed signal voltage at the other side of this capacitor, to its original value, this transistor T17 turns on again. Since resistor R33 and capacitor C11 determine the initial deceleration value at which transistor T17 turns off, transistor T17 is turned on again at the extant speed (as hereinbefore defined). As a result, if the wheel speed is below the extant speed when there is solenoid de-energisation due to transistor T9 being turned on again, transistor T17 maintains the production of the reference rates from the circuit elements 113 – 116. Thus, transistor T9 can turn off again to re-energise the solenoid if the change in the speed signal voltage thereafter assumes the prevailing reference rate and it is not until the extant speed is reached that the solenoid can be finally de-energised to terminate an anti-lock control action.

The output from transistor T17 also controls a circuit element 117 which is a reference over-ride circuit. In the event that this output is not terminated within a preset period as determined by capacitor C19 and resistor R56, transistor T26, which is turned on due to this output, is turned off again after such period to over-ride the turned-off condition of transistor T13 to bring about solenoid de-energisation. In a circuit arrangement without the circuit element 108, the output from transistor T13 could control the circuit element 117. The circuit element 108 comprises the unit 12 in FIG. 7.

The circuit arrangement also includes a circuit element 109 which is a low acceleration detector that produces an output when the wheel acceleration no longer exceeds a given value (e.g., 0.5 g). A transistor T18 in this circuit element is held turned on when either of transistors T17 and T24 are turned off, to inhibit the operation of this circuit element before the reference rate sequence is initiated and during the time that the circuit element 108 is operative. The speed signal voltage is applied to the circuit element 109 via capacitor C13. With transistor T18 turned on a transistor T20 is held in a partially conductive state, with a transistor T19 also conductive, independently of the speed signal voltage. When the transistor T17 is turned-on to remove the speed reference output, and with transistor T24 also turned on, transistor T18 is turned off. At this time, a decreasing speed signal voltage will tend to turn off transistor T20 which increases the conduction of transistor T19 to maintain a state of equilibrium: if the decrease is at a sufficient rate diode D7 will become reversed biased to maintain the equilibrium. An increasing speed signal voltage will tend to turn transistor T20 hard on. The change in voltage across a capacitor C14 has no effect at this time. However, when the change in speed signal voltage no longer exceeds a pre-set rate (e.g., corresponding to an acceleration value of 0.5 g) as determined by capacitor C13, the change in the collector voltage of transistor T20 causes a voltage change across capacitor C14 which is sufficient to turn on a transistor T21. The result of this is to inhibit, i.e., turn off, transistor T22 in the circuit element 110 for a period sufficient for the transistor T23 to turn on after its delay to reset the sequence control elements 113 to 116 so that transistor T9 is turned on to cause final solenoid de-energisation.

Suitable component types and component values of the circuit diagram of FIGS. 8 to 13 are as follows, for a road wheel diameter of 2 feet having a transducer toothed ring rotatable therewith which has 60 teeth/revolution. A typical output voltage from the magnetic pick-up would be 1 volt peak at 100 c.p.s. (7 m.p.h.) and 10 volts peak at 1,000 c.p.s. (approx. 70 m.p.h.).

RESISTORS

| | | |
|---|---|---|
| R1 = 680Ω | R20 = 8K2Ω | R39 = 100KΩ |
| R2 = 270Ω | R21 = 470KΩ | R40 = 1MΩ |
| R3 = 22KΩ | R22 = 820KΩ | R41 = 470KΩ |
| R4 = 47KΩ | R23 = 100KΩ | R42 = 180KΩ |
| R5 = 39KΩ | R24 = 470KΩ | R43 = 18KΩ |
| R6 = 1K5Ω | R25 = 150KΩ | R44 = 470KΩ |
| R7 = 220Ω | R26 = 39KΩ | R45 = 470KΩ |
| R8 = 68KΩ | R27 = 470KΩ | R46 = 470KΩ |
| R9 = 1K5Ω | R28 = 1MΩ | R47 = 220KΩ |

-Continued

| | | |
|---|---|---|
| R10 = 1KΩ | R29 = 22KΩ | R48 = 470KΩ |
| R11 = 147KΩ | R30 = 47KΩ | R49 = 10KΩ |
| R12 = 562KΩ | R31 = 10KΩ | R50 = 680KΩ |
| R13 = 100KΩ | R32 = 220Ω | R51 = 150KΩ |
| R14 = 47KΩ | R33 = 4M7Ω | R52 = 470KΩ |
| R15 = 2K2Ω | R34 = 82KΩ | R53 = 1MΩ |
| R16 = 47KΩ | R35 = 22KΩ | R54 = 100KΩ |
| R17 = 1MΩ | R36 = 470KΩ | R55 = 100KΩ |
| R18 = 470KΩ | R37 = 470KΩ | R56 = 1MΩ |
| R19 = 10KΩ | R38 = 100KΩ | R57 = 100KΩ |
| | | R58 = 100KΩ |
| | | R59 = 470KΩ |

CAPACITORS

| | | |
|---|---|---|
| C1 = 0.1μF | C7 = 0.022μF | C13 = 0.47μF |
| C2 = 0.22μF | C8 = 1μF | C14 = 0.22μF |
| C3 = 0.047μF | C9 = 2200pF | C15 = 0.15μF |
| C4 = 0.047μF | C10 = 0.68μF | C16 = 0.47μF |
| C5 = 0.022μF | C11 = 0.47μF | C17 = 0.033μF |
| C6 = 0.47μF | C12 = 0.47μF | C18 = 0.01μF |
| | | C19 = 0.15μF |
| | | C20 = 0.47μF |

DIODES

| | |
|---|---|
| D1 = BZY 88C6V8 (Mullard) | D11 = OA202 (Mullard) |
| D2 = OA202 (Mullard) | D12 = OA202 (Mullard) |
| D3 = OA202 (Mullard) | D13 = OA202 (Mullard) |
| D4 = OA202 (Mullard) | D14 = OA202 (Mullard) |
| D5 = OA202 (Mullard) | D15 = OA202 (Mullard) |
| D6 = BZW 95C39 (Mullard) | D16 = OA202 (Mullard) |
| D7 = OA202 (Mullard) | D17 = OA202 (Mullard) |
| D8 = OA202 (Mullard) | |
| D9 = OA202 (Mullard) | |
| D10 = OA202 (Mullard) | |

TRANSISTORS

| | |
|---|---|
| T1 = BC108 (Mullard) | T14 = BC108 (Mullard) |
| T2 = BC108 (Mullard) | T15 = BFX29 (Mullard) |
| T3 = BC108 (Mullard) | T16 = BD201 (Mullard) |
| T4 = BC108 (Mullard) | T17 = BC108 (Mullard) |
| T5 = BCY71 (Mullard) | T18 = BC108 (Mullard) |
| T6 = BCY71 (Mullard) | T19 = BC108 (Mullard) |
| T7 = BC108 (Mullard) | T20 = BC108 (Mullard) |
| T8 = BC108 (Mullard) | T21 = BC108 (Mullard) |
| T9 = BC108 (Mullard) | T22 = BC108 (Mullard) |
| T10 = BCY71 (Mullard) | T23 = BC108 (Mullard) |
| T11 = BC108 (Mullard) | T24 = BC108 (Mullard) |
| T12 = BC108 (Mullard) | T25 = BC108 (Mullard) |
| T13 = BC108 (Mullard) | T26 = BC108 (Mullard) |

One modification of the circuit arrangement of FIGS. 8 to 13 is shown in FIGS. 14 and 15. This is a modification to the speed reference circuit element 108 to provide a constant wheel speed reference for a preset period, followed by the original wheel speed reference as provided by the circuit element 108. The effect of such a modification is to extend the period for which the circuit element 108 remains effective to maintain the reference control sequence. This effect is illustrated in FIG. 15, which shows a graph of speed against time. The curve WS represents the wheel speed signal which at speed S1 has exceeded the deceleration value needed to render circuit element 108 operative to produce the speed reference curve RS'. The circuit of FIG. 14, to be described, maintains the speed reference curve horizontal (i.e., zero deceleration reference) until a preset time T*a*, after which the curve RS' has the slope of the original speed reference curve of circuit element 108. The speed reference curve is terminated at time T*b* when the wheel speed WS recovers to the speed S2. Comparison with FIG. 5 shows that this modification increases the period for which the wheel speed WS is below the speed reference curve, thereby increasing the period during which the reference control sequence is maintained.

In the circuit of FIG. 14, a transistor T27, which is normally turned hard on by current into its base via a resistor R63, is turned off due to a discharge of a capacitor C21 when the collector of transistor T24 (element 112) goes low on solenoid energisation. With transistor T27 turned off, a transistor T28 is turned on to clamp near earth potential one end of resistor R33, which end has been disconnected from the 6.8V supply line (see element 108). As a result, there is no charging circuit for capacitor C11, as previously. Transistor T27 remains turned off for a period (T1 – T*a*) determined by the time taken for capacitor C21 to recharge through resistor R63, as modified by the speed signal voltage applied from the emitter of transistor T6, to bring the base of transistor T27 to a voltage causing this transistor T27 to turn on again. Once this happens, transistor T28 is turned off, so that resistor R33 is effectively reconnected to the 6.8V supply line to complete the charge path for capacitor C11 to allow the original reference speed curve to be generated.

A second modification of the circuit arrangement of FIGS. 8 to 13 is shown in FIGS. 16 and 17. This is a modification to the reference rate sequence elements 115 and 114 to provide a "slope" change from the –0.1 g reference rate to the –3 g reference rate, and a slope change from the –3 g reference rate to the + 6 g reference rate. The modified reference rate sequence is illustrated in FIG. 17 which shows a graph of ± g against time. The curve GV represents the G setting during the reference rate sequence. Time T1 is when the first deceleration value G1 (1.0 g) changes to a small deceleration value G2 (0.1 g) (due to resistor R50 and diode D9). Time T2 is when the deceleration value G3 (–3 g) is reached, and time T3 is when the acceleration value G4 (+ 6 g) is reached.

The circuit of FIG. 16 replaces the circuit elements 114 and 115. A transistor T29 provides the 0.1 g to –3 g slope, this transistor being normally turned off when the collector of transistor T23 (circuit element 111) is low and being progressively brought into conduction following solenoid energisation. This is achieved by a capacitor C22 charging up through a resistor R67 when a diode D20 is reverse biased once transistor T23 has turned off. The charge on capacitor C22 is limited, once a diode D21 becomes forward biased, by the potential at the junction of resistors R66 and R70, so that the current from the emitter of transistor T29 is limited to a value appropriate for the –3 g setting. The charging rate of capacitor C22 determines the slope of the G setting.

A transistor T30 provides the –3 g to + 6 g slope, this transistor being normally turned off when the collector of transistor T24 is high and being progressively brought into conduction following solenoid energisation. This is achieved by capacitor C16 discharging through resistor R51 when diode D10 is reverse biased once transistor T24 has turned on. The discharging rate of capacitor C22 determines the slope of the G setting.

Suitable component types and component values for the circuits of FIGS. 14 and 16 are as follows:

| RESISTORS | | CAPACITORS |
|---|---|---|
| R60 = 1MΩ | R66 = 10KΩ | C21 = 1μF |
| R61 = 10KΩ | R67 = 82KΩ | C22 = 0.22μF |
| R62 = 5K6Ω | R68 = 82KΩ | |
| R63 = 1MΩ | R69 = 470KΩ | |
| R64 = 470KΩ | R70 = 33KΩ | |
| R65 = 100KΩ | R71 = 150KΩ | |

| DIODES | TRANSISTORS |
|---|---|
| D18 - D21 — OA 202 (Mullard) | T27 — BC 108 (Mullard) |
| | T28 — do. |

-Continued

| |
|---|
| T29 — do. |
| T30 — BCY 71 (Mullard) |

What we claim is:

1. An electronic control circuit for an anti-lock vehicle brake system, said control circuit comprising, means responsive to an input signal having a quantity which is a function of wheel speed to produce an output signal for causing energisation of a solenoid valve when said quantity has changed at a rate in excess of a first reference rate and by an amount which is greater by a given percentage than its amount of change would have been had its change continued at that first reference rate, the latter corresponding to a first value of wheel deceleration, means for establishing said first reference rate within said control circuit, means for replacing said first reference rate by a second reference rate following the production of said output signal, said second reference rate corresponding to a second value of wheel deceleration that is more negative than said first value, means for replacing said second reference rate by a third reference rate after said second reference rate has persisted for a predetermined period of time, said third reference rate corresponding to a first value of wheel acceleration, and means responsive to said input signal for terminating said output signal to cause solenoid value deenergization when the rate of change of said quantity attains either said second reference rate or said third reference rate, whichever prevails at the time, the prevailing reference rate being replaced by said first reference rate when said output signal is terminated.

2. A control circuit as claimed in claim 1, wherein the change from said first reference rate to said second reference rate and/or the change from said second reference rate to said third reference rate is substantially instantaneous.

3. A control circuit as claimed in claim 1, wherein the change from said first reference rate to said second reference rate and/or the change from said second reference rate to said third reference rate is at a predetermined rate of change.

4. A control circuit as claimed in claim 3, including a control means which is responsive to the same or similar input signal conditions that cause the production of said output signal for solenoid energisation and remains responsive until the input signal quantity has a value corresponding to a certain wheel speed relative to that obtaining when the control means was rendered responsive, the control circuit being so arranged that whilst said control means is responsive, the prevailing reference rate is not replaced by said first reference rate following termination of said output signal to cause solenoid de-energisation, but instead said second reference rate is allowed to persist for the remainder of said predetermined period of time with said third reference rate replacing it as aforesaid, or said third reference rate is maintained, depending on which reference rate was prevailing at the time said output signal was terminated, so that if said input signal quantity subsequently assumes either the second or the third prevailing reference rate whilst this quantity still has a value less than said value, the solenoid is re-energised by the reproduction of said output signal.

5. A control circuit as claimed in claim 4, wherein said certain wheel speed is the extant speed due to a selected deceleration value.

6. A control circuit as claimed in claim 5, wherein said selected deceleration value is said first value.

7. A control circuit as claimed in claim 5, wherein said selected deceleration value is slightly less than said first value.

8. A control circuit as claimed in claim 4, wherein said certain wheel speed is the speed which the wheel had when the control means was rendered responsive.

9. A control circuit as claimed in claim 4, wherein said certain wheel speed is changed to the extant speed due to a selected deceleration value which is slightly less than said first value after a pre-set period.

10. A control circuit as claimed in claim 9, arranged such that if the solenoid valve is still energised when said control means ceases to be responsive, said third reference rate is maintained, with the control circuit further including means responsive to terminate the output signal causing solenoid energisation when the rate of change of said input signal quantity no longer exceeds at least a fourth reference rate that corresponds to a second value of wheel acceleration that is lower than said first value.

11. A control circuit as claimed in claim 10 wherein said second reference rate is preceded by a further reference rate, which corresponds to a value of wheel deceleration much less negative than said first value of wheel deceleration, for a period just longer than the time taken for the solenoid to pull-in when it is energised.

12. A control circuit as claimed in claim 11, including means for delaying resetting to said first reference rate for a short period sufficient to allow solenoid release following the termination of said output signal.

13. A control circuit as claimed in claim 12, including means responsive, when resetting to said first reference rate occurs, to produce for a short period yet a further reference rate corresponding to a much higher value of wheel deceleration than said first deceleration value, before said first rate is reproduced.

14. A control circuit as claimed in claim 13, including a timer which automatically de-energises the solenoid valve and resets the control circuit to said first reference rate after a preset time.

15. A control circuit as claimed in claim 14, adapted for response to an input signal derived from a train of pulses the frequency of which is proportional to the speed of rotation of a wheel to be controlled by an anti-lock brake system embodying the control circuit.

16. A control circuit as claimed in claim 15, including means for producing from such train of pulses an input signal the amplitude of which varies with increase in wheel speed as a natural log. function.

17. A control circuit as claimed in claim 15, including means for producing from such train of pulses an input signal the amplitude of which is proportional to wheel speed, together with means for producing wheel slip detection in response to such input signal.

* * * * *

PO-1050
(5/69)

UNITED STATES PATENT OFFICE
CERTIFICATE OF CORRECTION

Patent No. 3,854,779 Dated December 17, 1974

Inventor(s) Derek R. Skoyles; Denis Sharp

It is certified that error appears in the above-identified patent and that said Letters Patent are hereby corrected as shown below:

Column 1, line 45, "type" should read --tyre--.

Column 2, line 27, "or" should read --for--.

Column 4, line 16, "extent" should read --extant--.

Column 5, line 33, after "invention;" add --and--.

line 35, cancel ": and" and insert --.--.

Signed and sealed this 4th day of March 1975.

(SEAL)
Attest:

RUTH C. MASON
Attesting Officer

C. MARSHALL DANN
Commissioner of Patents
and Trademarks